(12) United States Patent
Fujiwara

(10) Patent No.: US 12,473,456 B2
(45) Date of Patent: Nov. 18, 2025

(54) AQUEOUS DISPERSION, PRODUCTION METHOD THEREFOR, COATING COMPOSITION, AND COATING FILM

(71) Applicant: Nippon Shokubai Co., Ltd., Osaka (JP)

(72) Inventor: Makoto Fujiwara, Suita (JP)

(73) Assignee: Nippon Shokubai Co., Ltd., Osaka (JP)

(*) Notice: Subject to any disclaimer, the term of this patent is extended or adjusted under 35 U.S.C. 154(b) by 1208 days.

(21) Appl. No.: 17/265,598

(22) PCT Filed: Aug. 6, 2019

(86) PCT No.: PCT/JP2019/030988
§ 371 (c)(1),
(2) Date: Feb. 3, 2021

(87) PCT Pub. No.: WO2020/032063
PCT Pub. Date: Feb. 13, 2020

(65) Prior Publication Data
US 2022/0275152 A1 Sep. 1, 2022

(30) Foreign Application Priority Data
Aug. 6, 2018 (JP) .................................. 2018-147960

(51) Int. Cl.
| C09D 201/02 | (2006.01) |
| C08G 65/333 | (2006.01) |
| C08G 65/334 | (2006.01) |
| C08K 5/41 | (2006.01) |
| C09D 139/04 | (2006.01) |
| C09D 141/00 | (2006.01) |

(52) U.S. Cl.
CPC ... *C09D 201/025* (2013.01); *C08G 65/33396* (2013.01); *C08G 65/3348* (2013.01); *C08K 5/41* (2013.01); *C09D 139/04* (2013.01); *C09D 141/00* (2013.01); *C08G 2150/00* (2013.01)

(58) Field of Classification Search
CPC .......... C08G 65/33396; C08G 65/3348; C09D 201/025; C09D 201/08; C09D 171/02; C08L 101/025; C08L 101/08; C08L 71/02; C08L 33/14; C08K 5/42; C08F 212/08; C08F 220/1804; C08F 226/00; C08F 212/36
See application file for complete search history.

(56) References Cited

U.S. PATENT DOCUMENTS

| 2013/0196264 A1 | 8/2013 | Aoki et al. | |
| 2013/0273361 A1* | 10/2013 | Kamiya | H01L 24/29 |
| | | | 428/354 |
| 2015/0160592 A1 | 6/2015 | Aoki | |
| 2016/0033886 A1 | 2/2016 | Aoki et al. | |
| 2017/0029645 A1* | 2/2017 | Iuchi | C09D 11/03 |
| 2017/0152333 A1 | 6/2017 | Zorn et al. | |
| 2018/0066166 A1 | 3/2018 | Zorn et al. | |

FOREIGN PATENT DOCUMENTS

| CN | 1827725 A | 9/2006 | |
| CN | 1912039 A | 2/2007 | |
| CN | 1918251 A | 2/2007 | |
| CN | 101407688 A | 4/2009 | |
| CN | 102051146 A | 5/2011 | |
| CN | 103805106 A | 5/2014 | |
| CN | 105683325 A | 6/2016 | |
| CN | 107406561 A | 11/2017 | |
| JP | S61-089217 A | 5/1986 | |
| JP | H02-099537 A | 4/1990 | |
| JP | 2006124640 A * | 5/2006 | |
| JP | 2011-093956 A | 5/2011 | |
| JP | 2012-017377 A | 1/2012 | |
| JP | 2012-017378 A | 1/2012 | |
| JP | 2012-126085 A | 7/2012 | |
| JP | 2015-118311 A | 6/2015 | |
| JP | 2017-132993 A | 8/2017 | |
| JP | 2017-141474 A | 8/2017 | |
| JP | 7129481 B2 * | 9/2022 | ............... C08K 5/41 |
| KR | 102520999 B1 * | 4/2023 | ............... C08F 2/26 |
| WO | 2016/169819 A1 | 10/2016 | |
| WO | 2017/017090 A1 | 2/2017 | |

OTHER PUBLICATIONS

Lonza, "Industrial Solutions Materials Protection Proxel (TM) BD20 Preservative", Retrieved from the Internet: URL: https://monsonco.com/wp-content/uploads/2019/09/Proxel-BD-20.-TDS.pdf, XP055908192 (2015).
Extended European Search Report issued in counterpart European Patent Application No. 19847298.7 dated Apr. 19, 2022.
Nippon Shokubai Co., Ltd., EPOCROS, 1-14 (2015).
Kao Corporation, "GPS safety summary Emal E-27C," 1-15 (2014).
Yamada, "The environment-friendly surfactant for emulsion polymerization," Dai-Ichi Kogyo Seiyaku Shaho Tact' <<https://www.dksweb.co.jp/product/techinfo/index.html,https://www.dks-web.co.jp/catalog_pdf/521-1.pdf>> 2002, summer No. 521, p. 17.

(Continued)

*Primary Examiner* — Sophie Hon
(74) *Attorney, Agent, or Firm* — Morgan, Lewis & Bockius LLP

(57) ABSTRACT

An aqueous dispersion including a polymer having a 2-oxazoline group; and a surfactant, the surfactant containing a sulfuric acid ester compound represented by the following Chemical Formula (S):

$$R^1\text{—}O\text{—}(R^2O)nSO_3X \qquad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation.

14 Claims, No Drawings

(56) References Cited

OTHER PUBLICATIONS

Lonza, Building Products, "Wet State Preservation," (2016).
Arch Chemicals, Inc. "Proxel GXL Antimicrobial," (2016).
International Search Report issued in corresponding International Patent Application No. PCT/JP2019/030988 dated Oct. 15, 2019.
International Preliminary Report on Patentability and Written Opinion issued in corresponding International Patent Application No. PCT/JP2019/030988 dated Feb. 18, 2021.
Office Action issued in European Patent Application No. 19847298.7 dated Apr. 7, 2025.

* cited by examiner

AQUEOUS DISPERSION, PRODUCTION METHOD THEREFOR, COATING COMPOSITION, AND COATING FILM

TECHNICAL FIELD

The present disclosure relates to an aqueous dispersion, a production method therefor, a coating composition, and a coating film.

BACKGROUND ART

Since a 2-oxazoline group is crosslinkable, polymers having 2-oxazoline groups have been used as crosslinking agents or the like for crosslinking polymers having carboxyl groups, thiol groups, and the like (Patent Literatures 1 and 2). Polymers having 2-oxazoline groups are known to include emulsion type polymers (aqueous dispersions), in which the polymer is used in a state of being dispersed in water, or water-soluble type polymers, in which the polymer is dissolved in water and used, and the polymers are widely used in the fields of aqueous coating materials and the like.

CITATION LIST

Patent Literature

Patent Literature 1: Japanese Unexamined Patent Publication No. S61-89217
Patent Literature 2: Japanese Unexamined Patent Publication No. H02-99537

SUMMARY OF INVENTION

Technical Problem

In a case in which a resin emulsion including a polymer having a 2-oxazoline group is used as a crosslinking agent, the resin emulsion is mixed with a main agent resin including a functional group such as a carboxyl group and is thereby used as an aqueous resin composition. Such an aqueous resin composition is used for a coating material, a tacky adhesive and an adhesive, a surface treating agent, a textile treating agent, and the like, and such an aqueous resin composition is mainly coated on a base material or the like in a factory line, heated and dried, and is manufactured into a final product. In the case of being used in a factory line, there is a process of performing coating by spraying an aqueous resin composition under high pressure using a spray, a flow coater or the like, and in order to perform coating in a shorter period of time, it is required to spray the aqueous resin composition at higher pressure.

However, according to the investigation thoroughly conducted by inventors of the present invention, it has been found that a conventional resin emulsion including a polymer having a 2-oxazoline group has insufficient mechanical stability under such severe conditions, and in a case in which an aqueous resin composition is sprayed at high pressure, the resin emulsion produces aggregates. When the aggregates accumulate inside a spray apparatus or the like, the aggregates are likely to cause clogging in a nozzle and the like and rather cause deterioration in the productivity.

The present disclosure was achieved in view of the above-described circumstances, and it is an object of the present disclosure to provide an aqueous dispersion having high mechanical stability.

Solution to Problem

The aqueous dispersion of the present disclosure includes: a polymer having a 2-oxazoline group; and a surfactant, wherein the surfactant contains a sulfuric acid ester compound represented by the following Chemical Formula (S):

$$R^1\text{—}O\text{—}(R^2O)_n SO_3 X \qquad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation.

It is preferable that the proportion of the sulfuric acid ester compound with respect to the total amount of the surfactant included in the aqueous dispersion is 50% to 100% by mass.

It is preferable that the aqueous dispersion further includes an isothiazoline-based compound.

It is preferable that the aqueous dispersion includes 50 to 5,000 ppm by mass of the isothiazoline-based compound with respect to the total amount of the polymer.

It is preferable that the isothiazoline-based compound includes benzisothiazoline.

It is preferable that the aqueous dispersion includes 0.5% by mass or more of the sulfuric acid ester compound with respect to the total amount of the polymer.

It is preferable that the polymer includes 0.5% to 50% by mass of a structural unit having an oxazoline group with respect to the total mass of the polymer.

It is preferable that the polymer includes 5% to 40% by mass of a structural unit having an oxazoline group with respect to the total mass of the polymer.

The method for producing an aqueous dispersion of the present disclosure is a method for producing an aqueous dispersion including a polymer (A) having a 2-oxazoline group; and a surfactant, wherein the surfactant contains a sulfuric acid ester compound represented by the following Chemical Formula (S):

$$R^1\text{—}O\text{—}(R^2O)_n SO_3 X \qquad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation,
  wherein the method comprises a step of producing the polymer (A) by subjecting a monomer mixture containing an addition-polymerizable oxazoline to emulsion polymerization in the presence of the surfactant containing the sulfuric acid ester compound.

The coating composition of the present disclosure includes an aqueous dispersion and a polymer (B) having a carboxyl group, wherein the aqueous dispersion includes a polymer (A) having a 2-oxazoline group and a surfactant, and wherein the surfactant contains a sulfuric acid ester compound represented by the following Chemical Formula (S):

$$R^1\text{—}O\text{—}(R^2O)_n SO_3 X \qquad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation.

The coating film of the present disclosure includes a polymer (A) having a 2-oxazoline group, a sulfuric acid ester compound represented by the following Chemical Formula (S):

$$R^1\text{—}O\text{—}(R^2O)_n SO_3 X \qquad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation, and a polymer (B) having a carboxyl group.

Advantageous Effects of Invention

According to the present disclosure, an aqueous dispersion having high mechanical stability can be provided.

DESCRIPTION OF EMBODIMENTS

The aqueous dispersion of the present embodiment includes a polymer having a 2-oxazoline group and a surfactant, and the surfactant contains a sulfuric acid ester compound represented by the following Chemical Formula (S):

$$R^1-O-(R^2O)_n SO_3X \quad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation.

<Polymer Having 2-oxazoline Group: Polymer (A)>

The polymer having a 2-oxazoline group is not limited so long as it is a polymer containing a structural unit having a 2-oxazoline group, and regarding the structural unit having a 2-oxazoline group, only one kind thereof may be included, or two or more kinds thereof may be included. Furthermore, the polymer may also contain another structural unit that does not have a 2-oxazoline group. Meanwhile, hereinafter, the polymer having a 2-oxazoline group will be also referred to as polymer (A).

The structural unit having a 2-oxazoline group may be derived from a monomer having a 2-oxazoline group, or the structural unit may be derived from a compound other than a monomer having a 2-oxazoline group so long as the compound gives a structural unit having a 2-oxazoline group. Meanwhile, a structural unit having a 2-oxazoline group is, for example, a structural unit in which a C=C double bond of a monomer having a 2-oxazoline group has been substituted with a C—C single bond. For example, the polymer (A) is obtained by polymerizing a monomer having a 2-oxazoline group optionally with one or more kinds of other monomers (b) that do not have a 2-oxazoline group. Examples of the monomer having a 2-oxazoline group include monomers having an addition-polymerizable functional group (addition-polymerizable oxazoline), and the monomer may be an addition-polymerizable oxazoline (a) represented by the following General Formula (a).

[Chemical Formula 1]

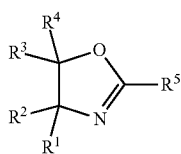

(a)

wherein $R^1$, $R^2$, $R^3$, and $R^4$ each independently represent a hydrogen atom, a halogen atom, a hydroxyl group, an alkyl group, an alkoxy group, an aralkyl group, a phenyl group, or a substituted phenyl group; and $R^5$ represents a non-cyclic organic group having an addition-polymerizable unsaturated bond.

Examples of the non-cyclic organic group having an addition-polymerizable unsaturated bond include a vinyl group, an isopropenyl group, a (meth)acryloyloxy group, and the like.

Specific examples of the addition-polymerizable oxazoline (a) include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and the like, and one kind or a mixture of two or more kinds selected from the group of these can be used. Above all, 2-isopropenyl-2-oxazoline is industrially easily available and is suitable.

Since the polymer (A) tends to be excellent in terms of the durability and water resistance of the cured product together with the curability when the polymer (A) is used as a crosslinking agent, it is preferable that the polymer (A) includes 0.5% to 50% by mass, preferably 1% to 45% by mass, more preferably 5% to 40% by mass or more, and even more preferably 5% to 30% by mass, of a structural unit having a 2-oxazoline group with respect to the total mass of the polymer (A).

The other monomers (b) are not particularly limited so long as they are monomers that do not react with a 2-oxazoline group and are capable of copolymerizing with an addition-polymerizable oxazoline (a). Examples include (meth)acrylic acid esters, such as alkyl (meth)acrylic acid esters such as methyl (meth)acrylate, butyl (meth)acrylate, and 2-ethylhexyl (meth)acrylate, hydroxy group-containing (meth)acrylic acid esters such as methoxy polyethylene glycol (meth)acrylate and 2-hydroxyethyl (meth)acrylate, amino group-containing (meth)acrylic acid esters such as 2-aminoethyl (meth)acrylate and salts thereof, unsaturated nitriles such as (meth)acrylonitrile; unsaturated amides such as (meth)acrylamide, N-methylol (meth)acrylamide, and N-(2-hydroxyethyl) (meth)acrylamide; vinyl esters such as vinyl acetate and vinyl propionate; vinyl ethers such as methyl vinyl ether and ethyl vinyl ether; α-olefins such as ethylene and propylene; halogen-containing α, β-unsaturated monomers such as vinyl chloride, vinylidene chloride, and vinyl fluoride; α,β-unsaturated aromatic monomers such as styrene, α-methylstyrene, and sodium styrene sulfonate; monomers having a plurality of vinyl groups in the molecule (crosslinking agents), such as divinylbenzene and trimethylolpropane tri(meth)acrylate; and the like. One kind or a mixture of two or more kinds of these can be used.

It is preferable that the polymer (A) includes 10% to 80% by mass, and more preferably 20% to 60% by mass, of a structural unit derived from an alkyl (meth)acrylic acid ester with respect to the total amount of the polymer (A). Furthermore, it is preferable that the polymer (A) includes 0.5% to 70% by mass, and more preferably 20% to 60% by mass, of a structural unit derived from an α,β-unsaturated aromatic monomer with respect to the total amount of the polymer (A). Furthermore, it is preferable that the polymer (A) includes 0.01% to 5% by mass, and more preferably 0.05% to 1% by mass, of a structural unit derived from a monomer having a plurality of vinyl groups in the molecule with respect to the total amount of the polymer (A).

The polymer (A) may include a structural unit derived from a monomer having an acid group. Examples of the monomer having an acid group include (meth)acrylic acid, acrylic acid, methacrylic acid, itaconic acid, maleic acid, fumaric acid, crotonic acid, vinyl acetate, vinyl lactate, unsaturated phosphonic acid, and the like. A monomer having an acid group tends to impart mechanical stability to a resulting copolymer. However, since the aqueous dispersion of the present embodiment includes the above-described sulfuric acid ester (S) and thereby has enhanced mechanical stability, the amount of the structural unit derived from a monomer having an acid group can be reduced from the polymer (A). Specifically, the content of a structural unit derived from a monomer having an acid group in the polymer (A) may be less than 0.5% by mass with respect to the total amount of the polymer (A), or the polymer (A) may not include at all a structural unit derived from a monomer having an acid group. Thereby, a reaction between an acid group and a 2-oxazoline group in the polymer (A) or in a monomer mixture can be suppressed.

The weight average molecular weight of the polymer (A) is preferably 100,000 to 5,000,000 g/mol, and more preferably 300,000 to 3,000,000 g/mol. The weight average molecular weight can be measured by gel permeation chromatography (GPC). The weight average molecular weight is measured under, for example, the following measurement conditions.

Measuring instrument: HLC-8120GPC (trade name, manufactured by Tosoh Corp.)
Molecular weight column: TSK-GEL GMHXL-L and TSK-GELG5000HXL (all manufactured by Tosoh Corp.) connected in series and used
Eluent: Tetrahydrofuran (THF)
Standard substance for calibration curve: Polystyrene (manufactured by Tosoh Corp.)
Measurement method: A substance to be measured is dissolved in THF such that the solid content will be about 0.2% by mass, the solution is filtered through a filter, and using the resultant as a measurement sample, the molecular weight is measured.

Furthermore, in the case of an aqueous dispersion including the polymer (A), the emulsion particles included in the aqueous dispersion include the polymer (A) and a surfactant; however, the emulsion particles may also have a crosslinked body in which the molecules of the polymer (A) have been bonded (crosslinked) by means of, for example, a crosslinking agent or the like. In a case in which the polymer (A) has a crosslinked body, it is difficult to measure the weight average molecular weight of the crosslinked body. Therefore, the upper limit value of the weight average molecular weight of the polymer (A) is not particularly limited.

The glass transition temperature (Tg) of the polymer (A) is not particularly limited; however, the glass transition temperature is preferably higher than −10° C., preferably −5° C. or higher, and more preferably 0° C. or higher. The upper limit of the glass transition temperature can be set to, for example, 50° C. or lower. The glass transition temperature can be measured by differential scanning calorimetry (ASTM D3418-08); however, the glass transition temperature may be a value estimated by the following Fox equation.

[Mathematical Formula 1]

$$\frac{1}{Tg'} = \left[\frac{W_1'}{T_1} + \frac{W_2'}{T_2} + \ldots + \frac{W_n'}{T_n}\right] \quad (1)$$

In Calculation Formula (1), Tg' represents the Tg (absolute temperature) of a polymer. $W_1', W_2', \ldots, W_n'$ are mass fractions of various monomers with respect to all the monomer components. $T_1, T_2, \ldots, T_n$ each represents the glass transition temperature (absolute temperature) of a homopolymer (homopolymer) composed of each of the monomer components.

The Tg values of representative homopolymers that are used for calculating the glass transition temperatures (Tg) of polymerizable monomer components by the above-described Calculation Formula (1) are shown below.
Methyl methacrylate (MMA): 105° C.
Styrene (St): 100° C.
Butyl acrylate (BA): −56° C.
2-Ethylhexyl acrylate (2EHA): −70° C.
Acrylic acid (AA): 95° C.
2-Isopropenyl-2-oxazoline: 100° C.

<Sulfuric Acid Ester Compound>
The sulfuric acid ester compound of the present embodiment is represented by the following Chemical Formula (S).

$$R^1-O-(R^2O)_n SO_3 X \quad (S)$$

In the formula, $R^1$ represents an aliphatic hydrocarbon group having 8 to 20 carbon atoms and is preferably a linear or branched aliphatic hydrocarbon group. Furthermore, $R^1$ is preferably an alkyl group represented by General Formula: $C_m H_{2m+1}$, in which m is preferably 8 to 20, more preferably 10 to 18, even more preferably 10 to 16, still more preferably 11 to 15, and particularly preferably 12 to 14. Specific examples include an octyl group, a nonyl group, a decyl group, an undecyl group, a dodecyl group, a tridecyl group, a tetradecyl group, a pentadecyl group, a hexadecyl group, a heptadecyl group, a nonadecyl group, an eicosyl group, and the like. Furthermore, $R^1$ may be a linear or branched aliphatic hydrocarbon group having one or more unsaturated double bonds and may be a linear or branched aliphatic hydrocarbon group having one unsaturated double bond. Specific examples of such $R^1$ include an oleyl group and the like.

$R^2$ represents an alkylene group represented by General Formula: $C_r H_{2r}$ (r represents 2 to 4), and specific examples include an ethylene group, a 1,3-propylene group, a 1,2-propylene group, a 1,4-butylene group, a 1,3-butylene group, a 1,2-butylene group, and the like. From the viewpoint that the mechanical stability of the aqueous dispersion is further increased, an ethylene group and a 1,2-propylene group are preferred.

n represents 2 to 15 and is preferably 2 to 10, more preferably 3 to 8, and even more preferably 3 to 6. n may be an integer; however, in a case in which the aqueous dispersion includes a plurality of kinds of sulfuric acid ester compounds represented by Chemical Formula (S), n may be an arithmetic mean (number average) of all of the sulfuric acid ester compounds included in the aqueous dispersion.

X represents a monovalent cation, and specific examples include ammonium ion, alkali metal ions, and the like. Examples of the alkali metal ions include sodium ion and potassium ion.

<Aqueous Dispersion>
The aqueous dispersion of the present disclosure includes the polymer (A) and a sulfuric acid ester compound. The content of the polymer (A) in the aqueous dispersion is preferably 1% to 80% by mass, more preferably 5% to 60% by mass, and even more preferably 10% to 50% by mass, with respect to the total amount of the aqueous dispersion. The aqueous dispersion of the present disclosure can include components other than the polymer (A) to the extent that the effects are not inhibited. Furthermore, the content of a non-volatile fraction in the aqueous dispersion of the present disclosure is preferably 1% to 80% by mass, more preferably 5% to 60% by mass, and even more preferably 10% to 50% by mass, with respect to the total amount of the aqueous dispersion.

An aqueous dispersion including the polymer (A) can be produced by performing polymerization of an addition-polymerizable oxazoline (a) and optionally at least one other monomer (b) in an aqueous medium according to a conventionally known polymerization method. More specifically, the aqueous dispersion of the present embodiment can be produced according to a production method comprising a step of subjecting a monomer mixture containing an addition-polymerizable oxazoline to emulsion polymerization in the presence of a surfactant containing the above-described sulfuric acid ester compound (step of producing the polymer (A)). Emulsion polymerization may be carried out against a pre-emulsion obtained by adding a monomer mixture to an aqueous solution including a surfactant or may be carried out while adding a monomer mixture dropwise to an aqueous solution including a surfactant. When the above-described sulfuric acid ester compound is used, emulsification of a monomer mixture is facilitated. In addition, when emulsion polymerization is carried out in the presence of the above-described sulfuric acid ester compound, the amount of aggregates produced during polymerization is small, and there is a tendency that emulsion polymerization can be carried out stably. The aqueous medium that can be used is not particularly limited; however, examples include water; or a mixed solution of water and an organic solvent such as methanol, ethanol, propanol, isopropanol, butanol, tertiary butanol, ethylene glycol, ethylene glycol monomethyl ether, ethylene glycol monobutyl ether, diethylene glycol, acetone, or methyl ethyl ketone.

The aqueous dispersion of the present embodiment comprises emulsion particles including the polymer (A) and water as a continuous phase. For the emulsion particles including the polymer (A), the average particle size measured for the aqueous dispersion by a dynamic light scattering method is preferably 10 to 300 nm, and more preferably 40 to 200 nm.

From the viewpoint of further increasing mechanical stability, the content of the sulfuric acid ester compound in the aqueous dispersion is preferably 0.5% by mass or more, more preferably 0.7% to 10% by mass, even more preferably 1% to 5% by mass, still more preferably 1.5% to 4% by mass, and most preferably 2% to 3.5% by mass, with respect to the total amount of the polymer having a 2-oxazoline group.

In order to further stabilize the emulsion particles, the aqueous dispersion may include a surfactant other than the above-described sulfuric acid ester compound. In a case in which the polymer (A) is obtained by emulsion polymerization, the surfactant may be added at the time of performing emulsion polymerization. Furthermore, the polymer (A) may also include a structural unit derived from a reactive emulsifier.

The surfactant other than the above-described sulfuric acid ester compound is not particularly limited, and for example, any surfactant selected from an anionic surfactant, a nonionic surfactant, a cationic surfactant, an amphoteric surfactant, a polymeric surfactant, a reactive surfactant, and the like can be used.

Specific examples of the anionic surfactant include alkali metal alkyl sulfates such as sodium dodecyl sulfate and potassium dodecyl sulfate; ammonium alkyl sulfates such as ammonium dodecyl sulfate; sodium dodecyl polyglycol ether sulfate; sodium sulforicinoleate; alkyl sulfonates such as alkali metal salts of sulfonated paraffin and ammonium salt of sulfonate paraffin; fatty acid salts such as sodium laurylate, triethanolamine oleate, and triethanolamine abietate; alkyl aryl sulfonates such as sodium dodecyl benzene sulfonate and alkali metal sulfates of alkali phenol hydroxyethylene; higher alkyl naphthalene sulfonic acid salts; naphthalene sulfonic acid-formalin condensate; dialkyl sulfosuccinic acid salts; polyoxyethylene alkyl sulfate salts; polyoxyethylene alkyl aryl sulfate salts; and the like.

Regarding the nonionic surfactant, specifically, for example, polyoxyethylene alkyl ether; polyoxyethylene alkyl aryl ether; sorbitan fatty acid esters; polyoxyethylene sorbitan fatty acid esters; fatty acid monoglycerides such as monolaurate of glycerol; polyoxyethylene-oxypropylene copolymers; condensation products of ethylene oxide and aliphatic arines, amides, or acids; and the like can be used.

Specific examples of the polymeric surfactant include polyvinyl alcohol; sodium poly(meth)acrylate, potassium poly(meth)acrylate, ammonium poly(meth)acrylate, polyhydroxyethyl (meth)acrylate; polyhydroxypropyl (meth)acrylate; copolymers of two or more kinds of polymerizable monomers, which are constituent units of these polymers, or copolymers of these polymerizable monomers with other monomers; and the like. Furthermore, since phase transfer catalysts such as crown ethers exhibit surface activity, they may also be used as surfactants.

The reactive surfactant may be a surfactant having one or more polymerizable carbon-carbon unsaturated bonds in the molecule, and specific examples include anionic reactive surfactants such as surfactants having the structures of propenyl-2-ethylhexyl benzene sulfosuccinic acid ester sodium, sulfuric acid ester of polyoxyethylene (meth)acrylate, polyoxyethylene alkyl propenyl ether ammonium sulfate salt, phosphoric acid ester of (meth)acrylic acid polyoxyethylene ester, bis(polyoxyethylene polycyclic phenyl ether) methacrylated sulfuric acid ester ammonium salts, and polyoxyethylene alkyl aryl sulfate salts, and having polymerizable groups such as a propenyl group, an isopropenyl group, an allyl group, an acrylate group, and a methacrylate group; nonionic reactive surfactants such as surfactants having the structures of polyoxyethylene alkyl benzene ether (meth)acrylic acid ester, polyoxyethylene alkyl ether (meth)acrylic acid ester, and polyoxyethylene alkyl aryl ether, and having polymerizable groups such as an isopropenyl and an aryl group; and the like. The use of these surfactants may be use of only one kind thereof or combined use of two or more kinds thereof; however, when the water resistance of a dried coating film from an aqueous resin dispersion is considered, a reactive surfactant is preferred.

The amount of use of a surfactant other than the sulfuric acid ester compound is not particularly limited; however, the amount of use is preferably 0.3% to 5% by mass, and more preferably 0.5% to 3% by mass, with respect to the amount of use of all polymerizable monomer components. When the amount of use of the surfactant other than the sulfuric acid ester compound is too large, the water resistance of the coating film is deteriorated, and when the amount of use is too small, the polymerization stability of resin particles is notably deteriorated. Since the particle size of a resin is significantly affected even by the type of the surfactant other than the sulfuric acid ester compound, it is more necessary to appropriately select the amount of use in the above-described range depending on the surfactant used.

The aqueous dispersion may not include a surfactant other than the sulfuric acid ester compound. The proportion of the sulfuric acid ester compound with respect to the total amount of the surfactants included in the aqueous dispersion is preferably 50% to 100% by mass, and more preferably 75% to 100% by mass.

The aqueous dispersion of the present embodiment may include an antiseptic agent. The antiseptic agent is not particularly limited; however, an example may be an isothiazoline-based compound. By including an isothiazoline-based compound, antiseptic performance or antibacterial performance can be imparted to the aqueous dispersion without causing aggregation of the emulsion particles included in the aqueous dispersion. The isothiazoline-based compound is not particularly limited so long as it can impart antiseptic performance or antibacterial performance to the aqueous dispersion; however, examples include a compound represented by the following Formula (1) and a compound represented by Formula (2).

[Chemical Formula 2]

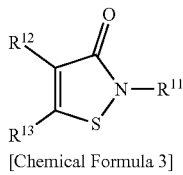

(1)

[Chemical Formula 3]

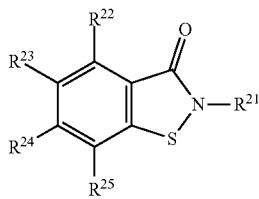

(2)

wherein in Formula (1), $R^{11}$ represents a hydrogen atom or an alkyl group having 1 to 10 carbon atoms, and preferably 1 to 6 carbon atoms; $R^{12}$ represents a hydrogen atom, a halogen atom, or an alkyl group having 1 to 6 carbon atoms, and preferably 1 to 4 carbon atoms; and $R^{13}$ represents a hydrogen atom, a halogen atom, or an alkyl group having 1 to 6 carbon atoms. In Formula (2), $R^{21}$ represents a hydrogen atom or an alkyl group having 1 to 10 carbon atoms; and $R^{22}$ to $R^{25}$ each independently represent a hydrogen atom or an alkyl group having 1 to 6 carbon atoms.

Examples of $R^{11}$ and $R^{21}$ include a methyl group, an ethyl group, a propyl group, a butyl group, a pentyl group, a hexyl group, a heptyl group, an octyl group, a nonyl group, and a decyl group. Examples of the alky group having 1 to 6 carbon atoms of $R^{12}$, $R^{13}$, and $R^{22}$ to $R^{25}$ include a methyl group, an ethyl group, a propyl group, a butyl group, a pentyl group, and a hexyl group. Examples of the halogen atom of $R^3$ include a chlorine atom.

The aqueous dispersion may include only one kind of an isothiazoline-based compound or may include two or more kinds thereof. The content of the isothiazoline compound in the aqueous dispersion is preferably 10 to 5,000 ppm by mass, more preferably 20 to 2,000 ppm by mass, even more preferably 50 to 1,000 ppm by mass, and particularly preferably 100 to 500 pm by mass, with respect to the total amount of the polymer having a 2-oxazoline group.

The isothiazoline-based compound is preferably benzisothiazoline (1,2-benzisothiazol-3-one), methylisothiazoline (2-methyl-4-isothiazolin-3-one), or methylchloroimidazoline (5-chloro-2-methyl-4-isothiazolin-3-one), and benzisothiazoline is more preferred.

It is also possible to add a solvent, a plasticizer, an inorganic or organic filler, a coloring pigment, a dye, a thickening agent, a dispersant, a wetting agent, an antifoaming agent, a rust inhibitor, and the like to the aqueous dispersion as necessary, to the extent that the purpose of the present disclosure is not impaired.

The viscosity of the aqueous dispersion is not particularly limited; however, from the viewpoint of easy handleability, the viscosity is preferably 1,000 mPa·s or less, and more preferably 1 to 100 mPa·s, at room temperature (25° C.). The viscosity of the aqueous dispersion can be measured using a B type viscometer.

By further incorporating a main agent resin having a functional group that can ring-open a 2-oxazoline group of the polymer (A) and perform a crosslinking reaction into the aqueous dispersion of the present embodiment, the aqueous dispersion can be produced into a curable coating composition. An example of such a main agent resin may be a polymer having a carboxyl group. Hereinafter, a polymer having a carboxyl group will be referred to as polymer (B).

The polymer (B) may be a water-soluble or water-dispersible polymer having a carboxyl group. The polymer (B) has a structural unit derived from a monomer having a carboxyl group, and examples include an acrylic resin, a polyester resin, a polyurethane resin, a polyolefin resin, and the like, while an acrylic resin is preferred. Regarding the amount of carboxyl groups in a case in which the polymer (B) as a main agent is an acrylic resin, when the amount of a structural unit derived from a monomer having a carboxyl group is adjusted preferably to 1 to 15 parts by mass, more preferably 2 to 10 parts by mass, and most preferably 3 to 8 parts by mass, while the total mass of the polymer (B) is designated as 100 parts by mass, the cured coating film of the coating composition becomes tough, and a coating film having excellent water resistance, durability, and tight adhesiveness to a base material is formed. Incidentally, the structural unit derived from a monomer having a carboxyl group may be derived from a monomer having a carboxyl group or may be derived from a monomer other than a monomer having a carboxyl group. Furthermore, the structural unit derived from a monomer having a carboxyl group is, for example, a structural unit in which a C=C double bond of the monomer having a carboxyl group has been substituted with a C—C single bond. Incidentally, it is acceptable that the carboxyl group carried by the polymer (B) is not neutralized; however, it is also acceptable that the carboxyl group is neutralized.

With regard to the polymer (B), examples of the monomer having a carboxyl group include monocarboxylic acids, dicarboxylic acids, dicarboxylic acid monoesters, and the like. More specific examples include (meth)acrylic acid, maleic acid, fumaric acid, crotonic acid, itaconic acid, citraconic acid, maleic anhydride, monomethyl maleate, monobutyl maleate, monomethyl itaconate, monobutyl itaconate, vinylbenzoic acid, oxalic acid monohydroxyethyl (meth)acrylate, carboxyl group-terminated caprolactone-modified acrylate (for example, "PLACCEL FA" series; manufactured by Daicel Industries, Ltd.), carboxyl group-terminated caprolactone-modified methacrylate (for example, "PLACCEL FMA" series; manufactured by Daicel Industries, Ltd.), and the like. Among these, (meth)acrylic acid and itaconic acid are preferred. One kind or two or more kinds of these can be appropriately selected and used. Among these, (meth)acrylic acid, which makes the viscosity of the polymer suitable for operation, is preferred.

The monomer other than a monomer having a carboxyl group is not particularly limited; however, for example, the following may be mentioned. In order to exhibit performance originating from monomers, one kind or two or more kinds thereof can be appropriately selected and used.

(Meth)acrylic acid alkyl or cycloalkyl ester monomers, such as methyl (meth)acrylate, ethyl (meth)acrylate, propyl (meth)acrylate, isopropyl acrylate, n-butyl (meth)acrylate, isobutyl (meth)acrylate, isobutyl (meth)acrylate, t-butyl (meth)acrylate, 2-ethylhexyl methacrylate, n-octyl (meth) acrylate, lauryl (meth)acrylate, dodecyl (meth)acrylate, stearyl (meth)acrylate, 2-ethylhexyl carbitol (meth)acrylate, isobornyl (meth)acrylate, cyclohexyl (meth)acrylate, methyl cyclohexyl (meth)acrylate, t-butyl cyclohexyl (meth)acrylate, and cyclododecyl (meth)acrylate.

Hydroxyl group-containing monomers, particularly hydroxyl group-containing (meth)acrylic acid esters, such as 2-hydroxyethyl (meth)acrylate, 2-hydroxypropyl (meth) acrylate, 3-hydroxypropyl (meth)acrylate, 2-hydroxybutyl (meth)acrylate, 4-hydroxybutyl (meth)acrylate, and caprolactone-modified hydroxy(meth)acrylate (for example, "PLACCEL F" series manufactured by Daicel Chemical Industries, Ltd., or the like).

Alkoxyalkyl esters of (meth)acrylic acid, such as methoxybutyl (meth)acrylate, methoxyethyl (meth)acrylate, ethoxybutyl (meth)acrylate, and trimethylolpropane tripropoxy (meth)acrylate. Hydroxysilane and/or hydrolysable silane group-containing vinyl-based monomers, such as vinyltrimethoxysilane, vinyltriethoxysilane, vinyltri(methoxyethoxy)silane, γ-(meth)acryloyloxypropyltrimethoxysilane, 2-styrylethyltrimethoxysilane, vinyltrichlorosilane, γ-(meth)acryloyloxypropylhydroxysilane, and γ-(meth)acryloyloxypropylmethylhydroxysilane.

Nitrogen-containing monomers such as (meth)acrylamide, N-monomethyl (meth)acrylamide, N-monoethyl (meth) acrylamide, N,N-dimethyl (meth)acrylamide, N-n-propyl (meth)acrylamide, N-isopropyl (meth)acrylamide, methylenebis(meth)acrylamide, N-methylol (meth)acrylamide, N-butoxymethyl (meth)acrylamide, (meth)acryloyloxyethyltrimethylammonium chloride, dimethylaminoethyl (meth) acrylate, dimethylaminoethyl (meth)acrylamide, ethylene oxide-added (meth)acrylate of morpholine, N-vinylpyridine, N-vinylimidazole, N-vinylpyrrole, N-vinylpyrrolidone, N-vinyloxazolidone, N-vinylsuccinimide, N-vinylmethyl carbamate, N,N-methylvinyl acetamide, 2-isopropenyl-2-oxazoline, 2-vinyl-2-oxazoline, and (meth)acrylonitrile.

Aziridinyl group-containing monomers such as (meth) acryloylaziridine and 2-aziridinylethyl (meth)acrylate.

Epoxy group-containing monomers such as glycidyl (meth)acrylate, α-methylglycidyl acrylate, α-methylglycidyl methacrylate (for example, "MGMA" manufactured by Daicel Chemical Industries, Ltd.), glycidyl aryl ether, oxocyclohexylmethyl (meth)acrylate, 3,4-epoxycyclohexylmethyl acrylate (for example, "CYCLOMER (registered trademark) A400" manufactured by Daicel Chemical Industries, Ltd., or the like), and 3,4-epoxycyclohexylmethyl methacrylate (for example, "CYCLOMER (registered trademark) M100" manufactured by Daicel Chemical Industries, Ltd., or the like).

Aromatic vinyl monomers such as styrene, α-methylstyrene, vinyltoluene, and chloromethylstyrene.

Carbonyl group-containing monomers such as (meth) acrylates such as acrolein, diacetone acrylamide, formylstyrol, vinyl alkyl ketones having 4 to 7 carbon atoms (vinyl ethyl ketone and the like), (meth)acryloxyalkylpropenal, acetonyl acrylate, diacetone (meth)acrylate, 2-hydroxypropyl acrylate acetylacetate, and butanediol-1,4-acrylate acetylacetate. Perfluoroalkyl (meth)acrylates such as perfluorobutylethyl (meth)acrylate, perfluoroisononylethyl (meth)acrylate, and perfluorooctylethyl (meth)acrylate.

Ultraviolet-stable monomers such as 4-(meth)acryloyloxy-2,2,6,6-tetramethylpiperidine (for example, "ADEKASTAB (registered trademark) LA-87" manufactured by Asahi Denka Co., Ltd.), 4-(meth)acryloylamino-2,2,6,6-tetramethylpiperidine, 4-(meth)acryloyloxy-1,2,2,6,6-pentamethylpiperidine (for example, "ADEKASTAB (registered trademark) LA-82" manufactured by Asahi Denka Co., Ltd.), 4-(meth)acryloyl-1-methoxy-2,2,6,6-tetramethylpiperidine, 4-cyano-4-(meth)acryloyloxy-2,2,6,6-tetramethylpiperidine, 1-(meth)acryloyl-4-(meth)acryloylamino-2,2,6,6-tetramethylpiperidine, 4-crotonoylamino-2,2,6,6-tetramethylpiperidine, 4-(meth)acryloylamino-1,2,2,6,6-pentamethylpiperidine, 4-cyano-4-(meth)acryloylamino-2,2,6,6-tetramethylpiperidine, 4-crotonoyloxy-2,2,6,6-tetramethylpiperidine, 1-(meth)acryloyl-4-cyano-4-(meth) acryloylamino-2,2,6,6-tetramethylpiperidine, and 1-crotonoyl-4-crotonoyloxy-2,2,6,6-tetramethylpiperidine.

Benzotriazole-based ultraviolet-absorbing monomers such as 2-[2'-Hydroxy-5'-(meth)acryloyloxymethylphenyl]-2H-benzotriazole, 2-[2-hydroxy-5-(meth)acryloyloxyethylphenyl]-2H-1,2,3-benzotriazole, 2-[2'-hydroxy-5'-(meth)acryloyloxymethylphenyl]-5-t-butyl-2H-benzotr iazole, 2-[2'-hydroxy-5'-(meth)acryloylaminomethyl-5'-t-octylphenyl]-2H-benz otriazole, 2-[2'-hydroxy-5'-(meth)acryloyloxypropylphenyl]-2H-benzotriazole, 2-[2'-hydroxy-5'-(meth)acryloyloxyhexylphenyl]-2H-benzotriazole, 2-[2'-hydroxy-3'-t-butyl-5'-(meth)acryloyloxyethylphenyl]-2H-benzotria zole, 2-[2'-hydroxy-3'-t-butyl-5'-(meth) acryloyloxyethylphenyl]-5-chloro-2H-benzotriazole, 2-[2'-hydroxy-5'-t-butyl-3'-(meth)acryloyloxyethylphenyl]-2H-benzotria zole, 2-[2'-hydroxy-5'-(meth) acryloyloxyethylphenyl]-5-chloro-2H-benzotria zole, 2-[2'-hydroxy-5'-(meth)acryloyloxyethylphenyl]-5-cyano-2H-benzotriaz ole, 2-[2'-hydroxy-5'-(meth) acryloyloxyethylphenyl]-5-t-butyl-2H-benzotria zole, and 2-[2'-hydroxy-5'-(β-(meth)acryloyloxyethoxy)-3'-t-butylphenyl]-4-t-but yl-2H-benzotriazole.

Benzophenone-based ultraviolet-absorbing monomers such as 2-hydroxy-4-(meth)acryloyloxybenzophenone, 2-hydroxy-4-[2-hydroxy-3-(meth)acryloyloxy]propoxybenzophenone, 2-hydroxy-4-[2-(meth)acryloyloxy]ethoxybenzophenone, 2-hydroxy-4-[3-(meth)acryloyloxy-2-hydroxypropoxy]benzophenone, and 2-hydroxy-3-t-butyl-4-[2-(meth)acryloyloxy]butoxybenzophenone.

It is preferable that the polymer (B) includes a structural unit derived from an alkyl (meth)acrylic acid ester at a proportion of 20% to 80% by mass, and more preferably 20% to 60% by mass, with respect to the total amount of the polymer (B). Furthermore, it is preferable that the polymer (B) includes a structural unit derived from an aromatic vinyl monomer at a proportion of 10% to 70% by mass, and more preferably 20% to 60% by mass, with respect to the total amount of the polymer (B).

The polymer (B) can be prepared by a known polymerization method such as conventional solution polymerization or emulsion polymerization. In a case in which the polymer (B) is obtained by emulsion polymerization, a preferred molecular weight is preferably 100,000 to 3,000,000, more preferably 300,000 to 2,000,000, and most preferably 500,000 to 1,000,000, as weight average molecular weight. By setting the molecular weight to this range, the balance between the film-forming properties and durability of the coating film is improved.

Furthermore, with regard to radical polymerization in an aqueous solution, the molecular weight is preferably 1,000 to 50,000, more preferably 3,000 to 30,000, and most preferably 5,000 to 20,000. By setting the molecular weight to this range, the balance between the workability at the time of coating and the coating film durability is improved.

Regarding the polymer (B), known polymers can be widely used. Examples include water-dispersible or water-soluble acrylic resins such as ACRYSET 19E, ACRYSET 210E, ACRYSET 260E, ACRYSET 288E, and AROLON 453 (all manufactured by NIPPON SHOKUBAI CO., LTD.); water-dispersible polyurethane resins such as SOFLANATE AE-10, SOFLANATE AE-40 (all manufactured by Nihon Soflan Chemical & Engineering Co., Ltd.), HYDRAN HW-110, HYDRAN HW-131, HYDRAN HW-135, HYDRAN HW-320, BONDIC 72070 (all manufactured by Dainippon Ink and Chemicals, Incorporated), POISE 710, POISE 720 (all manufactured by Kao Corporation), MELUSI 525, MELUSI 585, MELUSI 414, and MELUSI 455 (all manufactured by TOYOPOLYMER CO., LTD.); water-dispersible polyester resins such as VYLONAL MD-1200, VYLONAL MD-1400, VYLONAL MD-1930 (all manufactured by TOYOBO CO., LTD.), WD3652, and WJL6342 (all manufactured by Eastman Chemical Company); water-soluble, water-dilutable, or water-dispersible polyolefin-based resins such as ISOBAM-10, ISOBAM-06, ISOBAM-04 (all manufactured by Kuraray Co., Ltd., Isoprene Chemicals Division), PRIMACOR 5981, PRIMACOR 5983, PRIMACOR 5990, and PRIMACOR 5991 (all manufactured by The Dow Chemical Company); and the like.

The mixing proportions of the polymer (B) (polymer having a carboxyl group) and the polymer (A) (polymer having a 2-oxazoline group) in the coating composition of the present disclosure is preferably in the range of 1 to 50 parts by mass, more preferably in the range of 2 to 30 parts by mass, and even more preferably in the range of 3 to 10 parts by mass, of the polymer (A) with respect to 100 parts by mass of the polymer (B). By setting the amount ratio to this range, the degree of curing is sufficient, the durability, water resistance, and the like are satisfactory, and the tight adhesiveness to a substrate tends to be improved.

It is also possible to add a solvent, a plasticizer, an inorganic or organic filler, a coloring pigment, a dye, a thickening agent, a dispersant, a wetting agent, an antifoaming agent, a rust inhibitor, and the like to the coating composition of the present embodiment as necessary, to the extent that the purpose of the present disclosure is not impaired. On the occasion of producing the coating composition of the present embodiment, means that are conventionally used by manufacturers of the relevant field can be widely applied without limitations, and for example, the above-described aqueous dispersion and other additives as necessary may be appropriately added to and mixed with an aqueous dispersion of the polymer (B). Then, on the occasion of using the coating composition for a coating material, a surface treating agent, a coating agent, an adhesive, and a sealing agent, the coating composition may be applied on a base material by methods that are conventionally used in the relevant fields, such as a roll coater, a spray, immersion, and brush painting. Curing can be carried out for one day to two weeks at room temperature; however, if necessary, curing can also be carried out by heating such as heating for about 30 minutes at 120° C.

In a case in which the coating composition of the present embodiment includes the above-described isothiazoline-based compound, when the coating composition is used as an adhesive for textiles, there is a tendency that the adhesive power between a textile material and rubber can be enhanced. Therefore, the coating composition can be suitably used as an adhesive for textiles in automotive tires, belts, and the like. Furthermore, a textile material that has been adhered to rubber using the coating composition of the present embodiment is such that after the adhesion, when the textile material is detached from rubber, the amount of rubber attached to the surface of the textile material tends to be small.

Examples of the textile material include polyester textiles, nylon textiles, carbon textiles, aramid textiles, steel textiles, and the like. Examples of the rubber include acrylic rubber, isoprene rubber, chloroprene rubber, styrene-butadiene rubber, acrylonitrile-butadiene rubber, acrylonitrile-butadiene-styrene rubber, and the like.

The coating composition can be formed into a coating film by applying the coating composition on a base material and drying it. That is, the coating film of the present embodiment includes a polymer (A) having a 2-oxazoline group; a sulfuric acid ester compound represented by Chemical Formula (S):

$$R^1\text{—}O\text{—}(R^2O)_n SO_3 X \quad\quad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation; and a polymer (B) having a carboxyl group. The coating film may be heated at the time of drying, or may be heated and dried for 5 to 60 minutes at 100° C. to 140° C. The atmosphere at the time of drying is not particularly limited; however, the atmosphere may be an atmosphere at a relative humidity of 60% to 70%.

EXAMPLES

Examples 1 and 2 and Comparative Examples 1 and 2 (Production of Polymer Having 2-oxazoline Group)

Into a flask equipped with a stirrer, a reflux cooler, a nitrogen inlet tube, a thermometer, and a dropping funnel, 782.4 parts by mass of deionized water and 18.7 parts by mass of the surfactant described in Table 1 [2.9% by mass with respect to the mass of the monomer mixture that is to form a polymer having a 2-oxazoline group (corresponding to the mass of the polymer)] were introduced, pH was adjusted to 9.0 with an appropriate amount of 28% by mass of aqueous ammonia, and the mixture was heated to 70° C. while nitrogen gas was caused to slowly flow in. 64 parts by mass of a 5 mass % aqueous solution of potassium persulfate was poured thereto, and subsequently, while a monomer mixture prepared in advance composed of 288 parts by mass of butyl acrylate, 288 parts by mass of styrene, 64 parts by mass of 2-isopropenyl-2-oxazoline, and 6 parts by mass of divinylbenzene, was added dropwise thereto over 3 hours, a polymerization reaction was carried out. During the reaction, nitrogen gas was continuously blown, and the temperature inside the flask was maintained at 70° C.±1° C. The temperature was maintained the same for 2 hours even after completion of the dropwise addition, the internal temperature was raised to 80° C., and stirring was continued for one hour to complete the reaction. Subsequently, the reaction mixture was cooled and filtered through a 300-mesh wire gauze, and aggregates were separated. Thus, an aqueous dispersion of a polymer having a 2-oxazoline group at pH 8.0 was obtained. The amount of a non-volatile fraction was measure, and the amount was 43.5% by mass. The glass transition temperature of the polymer was estimated by Fox equation, and the value was 10° C. Furthermore, the average particle size (volume average particle size) of the emulsion particles included in the aqueous dispersion was measured using a particle size distribution analyzer ("NICOMP Model 380" manufactured by Particle Sizing Systems, LLC) based on a dynamic light scattering method. The results are presented in Table 1.

Comparative Example 3 (Production of Polymer Having 2-oxazoline Group)

An aqueous dispersion was produced by a method the same as that of Example 1, except that 25.8 parts by mass of the surfactant described in Table 1 [4.0% by mass with respect to the mass of a monomer mixture that is to form a polymer having a 2-oxazoline group (corresponding to the mass of the polymer)] was introduced. The amount of a non-volatile fraction was measured, and the amount was 43.5% by mass. The glass transition temperature of the polymer was estimated by Fox equation, and the value was 10° C. Furthermore, the average particle size (volume average particle size) of the emulsion particles included in the aqueous dispersion was measured using a particle size distribution analyzer ("NICOMP Model 380" manufactured by Particle Sizing Systems, LLC) based on a dynamic light scattering method. The results are presented in Table 1.

<Mechanical Stability>

For the various aqueous dispersions thus obtained, a Maron mechanical stability test was carried out under the following conditions. As the testing machine, trade name: "No. 156 Maron Mechanical Stability Tester" manufactured by YASUDA SEIKI SEISAKUSHO, LTD. was used. After the test, the sample was filtered through a 100-mesh wire gauze, and the mass of the collected aggregates was measured. The mass of the aggregates thus obtained with respect to the amount of the sample used in the test was calculated, and the aggregation ratio was determined. The results are presented in Table 1. As the aggregation ratio is smaller, the mechanical stability is excellent.

(Test Conditions)
Sample amount: 70 g
Load: 10 kg
Speed of rotation: 1,000 rpm
Testing time: 10 minutes <Ease of Emulsification>

In a flask, an aqueous solution in which 782.4 parts by mass of deionized water and a certain amount of each of the surfactants used in Examples 1 and 2 and Comparative Examples 1 to 3 (3% by mass with respect to the total amount of the deionized water and the monomer mixture) were added, was prepared. The ease of emulsification at the time of adding a monomer mixture having the same composition as that of the above-described monomer mixture to the aqueous solution, was evaluated according to the following criteria.

A: Emulsification could be achieved by adding the monomer mixture all at once and stirring the mixture for 15 minutes at a speed of rotation of 300 rpm.

B: Emulsification could not be achieved when the monomer mixture was added all at once; however, in a case in which the monomer mixture was added dividedly for 10 times, and the mixture was stirred for 15 minutes at a speed of rotation of 300 rpm each time a portion of the monomer mixture was added, emulsification was enabled.

C: Emulsification could not be achieved.

<Polymerization Stability>

The mass of aggregates that had been separated immediately after emulsion polymerization was measured, the proportion (%) with respect to the total amount of the aqueous dispersion was calculated, and the polymerization stability was evaluated according to the following criteria. The results are presented in Table 1.

A: The amount of aggregates is less than 0.2%.
B: The amount of aggregates is 0.2% to 1.0%.
C: The amount of aggregates is larger than 1.0%.

TABLE 1

|  | Example 1 | Example 2 | Comparative Example 1 | Comparative Example 2 | Comparative Example 3 |
| --- | --- | --- | --- | --- | --- |
| Surfactant | LA-10 | 08E | LA-16 | E-1000A | 4D/384 |
| Content* | 2.9 | 2.9 | 2.9 | 2.9 | 4.0 |
| Aggregation ratio (%) | 0.05 | 0.15 | 0.62 | 0.53 | 0.84 |
| Average particle size | 80 | 95 | 85 | 80 | 90 |
| Ease of emulsification | A | B | B | B | C |
| Polymerization stability | A | A | C | B | B |

*The content of the surfactant is an amount with respect to the total amount of the solid content of the aqueous dispersion (polymer having a 2-oxazoline group) (unit: mass %).

Incidentally, the surfactants in Table 1 are respectively as follows.

LA-10: manufactured by DKS Co. Ltd., trade name "HITENOL LA-10", compound represented by Chemical Formula (S), wherein $R^1$: lauryl, $R^2$: ethylene, n=4, X: $NH_4$.

08E: manufactured by DKS Co. Ltd., trade name "HITENOL 08E", compound represented by Chemical Formula (S), wherein $R^1$: oleyl, $R^2$: ethylene, n=8, X: $NH_4$.

LA-16: manufactured by DKS Co. Ltd., trade name "HITENOL LA-16", compound represented by Chemical Formula (S), wherein $R^1$: dodecyl, $R^2$: ethylene, n=16, X: $NH_4$.

E-1000A: manufactured by Kao Corporation, trade name "LAMUTEL E-1000A", polycyclic aromatic compound of the following chemical formula.

[Chemical Formula 4]

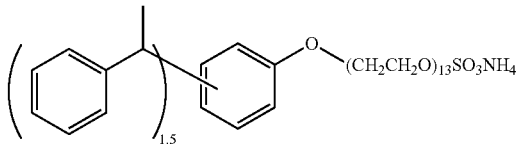

4D/384: manufactured by Solvay Japan, Ltd., trade name "4D/384", polyoxyethylene mono(tristyrenated phenyl) ether sulfuric acid ester ammonium salt.

As described in Table 1, Examples 1 and 2 have superior chemical stability compared to Comparative Examples 1 to 3.

Production Example 1 (Production of Acryl Emulsion)

Into a flask equipped with a stirrer, a reflux cooler, a nitrogen inlet tube, a thermometer, and a dropping funnel, 376.5 parts by mass of deionized water and 70.8 parts by mass of HITENOL N-08 (manufactured by DKS Co. Ltd., a 15 mass % aqueous solution of polyoxyethylene nonyl phenyl ether sulfuric acid ammonium salt) were introduced, and the mixture was heated to 80° C. while nitrogen gas was caused to slowly flow in. 5% by mass of a monomer mixture composed of 131 parts by mass of 2-ethylhexyl acrylate, 205 parts by mass of styrene, and 17 parts by mass of acrylic acid, the mixture having been prepared in advance, was introduced into the flask, and subsequently, 21 parts by mass of a 5 mass % aqueous solution of potassium persulfate was poured therein to initiate polymerization. After 10 minutes, the remaining monomer mixture was added dropwise thereto over 3 hours. During the reaction, nitrogen gas was continuously blown, and the temperature inside the flask was maintained at 80° C.±1° C. The flask was maintained at the same temperature for 1 hour even after completion of the dropwise addition, subsequently the flask was cooled, and the resulting mixture was adjusted to pH 8.5 with 9 parts by mass of 25 mass % aqueous ammonia. Thus, an acryl emulsion (polymer (B)) having 44.1% by mass of a non-volatile fraction at pH 8.5 was obtained.

The acryl emulsion produced in Production Example 1 was incorporated into the aqueous dispersions of Examples 1 and 2 and Comparative Examples 1 to 3, such that the amount of the polymer having a 2-oxazoline group would be 5 parts by mass with respect to 100 parts by mass of the acrylic polymer (non-volatile fraction) included in the acryl emulsion, and coating compositions (clear coating material) were obtained. For the coating compositions thus obtained, the following various characteristics were tested. The results are presented in Table 2.

<Solvent Resistance>

Each of the clear coating materials was applied on a glass plate (length: 15 cm, width: 7 cm) in an atmosphere at a temperature of 23° C.±2° C. and a relatively humidity of 65%±3% using an applicator such that the film thickness after drying would be 150 μm. This glass plate was left to stand for 2 minutes in this atmosphere, and subsequently the glass plate was heated for 30 minutes at a temperature of 120° C. and then left to cool. Thus, glass plates having coating films formed thereon were produced.

The coating films were reciprocatingly rubbed (rubbing test) 50 times with absorbent cotton soaked with methyl ethyl ketone, subsequently the condition of the coating film was visually observed, and the condition was evaluated based on the following evaluation criteria. Incidentally, as there is no change in the coating film, the crosslinking properties are satisfactory.

A: No change is recognized in the coating film.
B: Dissolution of a portion of the coating film is recognized.
C: Dissolution of the entire coating film is recognized.

<Resistance to Water-Whitening>

A glass plate having a coating film formed thereon was produced in the same manner as in the solvent resistance test. On the coating film of this glass plate having the coating film formed thereon, an opening of a glass tube having a diameter of 30 mm and a length of 30 mm was placed and adhered thereto. Subsequently, in a state in which 10 mL of ion-exchanged water had flown into the glass tube such that the coating film inside the glass tube would come into contact with water, the glass plate was left to stand for 24 hours in an atmosphere at a temperature of 23° C.±2° C. and a relative humidity of 65%±3%. Subsequently, the condition of the coating film that was in contact with ion-exchanged water was visually observed, and the coating film was evaluated based on the following evaluation criteria. Meanwhile, as the change in the coating film after the test is smaller compared to the coating film before the initiation of the test, the crosslinking properties are satisfactory.

(Evaluation Criteria)

A: Any change in the coating film is not recognized.
B: Slight cloudiness is recognized in a portion of the coating film.
C: Whitening is recognized in the entire coating film.

<Film Strength>

From the glass plate having a coating film formed thereon, which had been used in the solvent resistance test, the coating film was peeled off with a cutter blade, and the peeled coating film (free film) was used as a film for strength measurement. The film for strength measurement was stored for 24 hours in a constant temperature constant humidity chamber (temperature 25° C., humidity 60% RH). Subsequently, the film for strength measurement was gripped by chucks of a tensile testing machine [manufactured by SHIMADZU CORPORATION, trade name: AUTOGRAPH AGS-1000], and a tensile test was performed according to JIS P-8113. Thus, the tensile strength of the film for strength measurement was measured. The tensile strength of a film formed from a clear coating material of the acryl emulsion produced in Production Example 1 (coating material in which the aqueous dispersions of Examples 1 and 2 and Comparative Examples 1 to 3 were not incorporated) was designated as blank, and the blank was compared with the tensile strength of films formed from various clear coating materials obtained by incorporating the aqueous dispersions of Examples 1 and 2 and Comparative Examples 1 to 3. The results were evaluated according to the following criteria.

A: The strength became 1.5 times larger compared to the blank.
B: The strength was 1.0 to 1.5 times compared to the blank.

TABLE 2

| | Example 1 | Example 2 | Comparative Example 1 | Comparative Example 2 | Comparative Example 3 |
|---|---|---|---|---|---|
| Solvent resistance | A | A | A | B | C |
| Resistance to water-whitening | A | A | A | A | B |
| Film strength | A | A | A | A | B |

Examples 3 to 8

Aqueous dispersions were produced in the same manner as in Example 1, except that the monomer composition of the polymer having a 2-oxazoline group, which is included in the aqueous dispersion, or the type or the content of the additive (antiseptic agent or emulsifier) included in the aqueous dispersion was changed as indicated in Table 3. Evaluation of various performances was carried out. The results are presented in Table 3. Meanwhile, the abbreviations in Table 3 are as follows.

ST: Styrene
BA: Butyl acrylate
DVB: Divinylbenzene
IPO: 2-Isopropenyl-2-oxazoline
MMA: Methyl methacrylate
BIT: Benzisothiazoline (manufactured by Lonza Japan, Ltd., trade name: PROXEL GXL, content of benzisothiazoline: 20% by mass)

TABLE 3

|  |  | Example 1 | Example 2 | Example 3 | Example 4 | Example 5 | Example 6 |
|---|---|---|---|---|---|---|---|
| Polymer (A) (parts by mass) | ST | 288 | 288 | 288 | 288 | 333 | 350 |
|  | BA | 288 | 288 | 288 | 288 | 288 | 163 |
|  | DVB | 6 | 6 | 6 | 6 | 6 | 3 |
|  | IPO | 64 | 64 | 64 | 64 | 19 | 130 |
|  | MMA | — | — | — | — | — | — |
| Antiseptic agent | BIT (mass %) | — | — | 0.01 | 0.04 | — | — |
| Emulsifier | Type | LA-10 | 08E | LA-10 | LA-10 | 08E | LA-10 |
|  | Percentage content (mass %) | 2.9 | 2.9 | 2.9 | 2.9 | 2.0 | 2.9 |
| Aggregation ratio % |  | 0.05 | 0.15 | 0.06 | 0.05 | 0.12 | 0.05 |
| Average particle size nm |  | 80 | 95 | 80 | 80 | 120 | 90 |
| Ease of emulsification |  | A | B | A | A | B | A |
| Polymerization stability |  | A | A | A | A | A | A |
| Solvent resistance |  | A | A | A | A | B | A |
| Resistance to water-whitening |  | A | A | A | A | A | A |
| Film strength |  | A | A | A | A | A | A |

|  |  | Example 7 | Example 8 | Comparative Example 1 | Comparative Example 2 | Comparative Example 3 |
|---|---|---|---|---|---|---|
| Polymer (A) (parts by mass) | ST | 230 | 288 | 288 | 288 | 288 |
|  | BA | 200 | — | 288 | 288 | 288 |
|  | DVB | 6 | 6 | 6 | 6 | 6 |
|  | IPO | 210 | 64 | 64 | 64 | 64 |
|  | MMA | — | 288 | — | — | — |
| Antiseptic agent | BIT (mass %) | — | — | — | — | — |
| Emulsifier | Type | 08E | 08E | LA-16 | E-1000A | 4D/384 |
|  | Percentage content (mass %) | 2.9 | 3.5 | 2.9 | 2.9 | 2.9 |
| Aggregation ratio % |  | 0.18 | 0.1 | 0.62 | 0.53 | 0.84 |
| Average particle size nm |  | 85 | 70 | 85 | 80 | 90 |
| Ease of emulsification |  | B | A | B | B | C |
| Polymerization stability |  | B | A | C | B | B |
| Solvent resistance |  | A | A | A | B | C |
| Resistance to water-whitening |  | B | B | A | A | B |
| Film strength |  | A | A | A | A | B |

The invention claimed is:

1. An aqueous dispersion comprising:
a polymer (A) having a 2-oxazoline ring group; and
a surfactant,
wherein the surfactant contains a sulfuric acid ester compound represented by the following Chemical Formula (S):

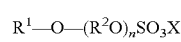

$$R^1\text{—}O\text{—}(R^2O)_n\text{SO}_3X \qquad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation,
wherein the aqueous dispersion comprises 0.7% by mass or more of the sulfuric acid ester compound with respect to the total amount of the polymer (A), and
wherein the polymer (A) includes 5% to 50% by mass of a structural unit having the 2-oxazoline ring group with respect to the total mass of the polymer (A).

2. The aqueous dispersion according to claim 1, wherein the proportion of the sulfuric acid ester compound with respect to the total amount of the surfactant included in the aqueous dispersion is 50% to 100% by mass.

3. The aqueous dispersion according to claim 1, further comprising an isothiazoline-based compound.

4. The aqueous dispersion according to claim 3, wherein the aqueous dispersion comprises 10 to 5,000 ppm by mass of the isothiazoline-based compound with respect to the total amount of the polymer (A).

5. The aqueous dispersion according to claim 3, wherein the isothiazoline-based compound includes benzisothiazoline.

6. The aqueous dispersion according to claim 1, wherein the polymer (A) includes 5% to 40% by mass of the structural unit having the 2-oxazoline group with respect to the total mass of the polymer (A).

7. A method for producing an aqueous dispersion including a polymer (A) having a 2-oxazoline ring group; and a surfactant,
wherein the surfactant contains a sulfuric acid ester compound represented by the following Chemical Formula (S):

$$R^1-O-(R^2O)_n SO_3 X \qquad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation,
wherein the method comprises a step of producing the polymer (A) by subjecting a monomer mixture containing an addition-polymerizable oxazoline monomer to emulsion polymerization in the presence of the surfactant containing the sulfuric acid ester compound, and
forming the aqueous dispersion including the polymer (A) having the 2-oxazoline ring group,
wherein the aqueous dispersion comprises 0.7% by mass or more of the sulfuric acid ester compound with respect to the total amount of the polymer (A), and
wherein the polymer (A) includes 5% to 50% by mass of a structural unit having the 2-oxazoline ring group with respect to the total mass of the polymer (A).

8. A coating film comprising:
a polymer (A) having a 2-oxazoline ring group;
a sulfuric acid ester compound represented by Chemical Formula (S):

$$R^1-O-(R^2O)_n SO_3 X \qquad (S)$$

wherein $R^1$ represents an aliphatic hydrocarbon group having 8 to 20 carbon atoms; $R^2$ represents an alkylene group having 2 to 4 carbon atoms; n represents 2 to 15; and X represents a monovalent cation; and
a polymer (B) having a carboxyl group;
wherein the coating film comprises 0.7% by mass or more of the sulfuric acid ester compound with respect to the total amount of the polymer (A), and
wherein the polymer (A) includes 5% to 50% by mass of a structural unit having the 2-oxazoline ring group with respect to the total mass of the polymer (A).

9. A coating composition comprising the aqueous dispersion according to claim 1 and a polymer (B) having a carboxyl group.

10. The aqueous dispersion according to claim 1 comprising emulsion particles.

11. The aqueous dispersion according to claim 1, wherein a weight average molecular weight of the polymer (A) is no less than 100,000.

12. The method according to claim 7, wherein the aqueous dispersion comprising emulsion particles.

13. The method according to claim 7, wherein a weight average molecular weight of the polymer (A) is no less than 100,000.

14. The coating film according to claim 8, wherein a weight average molecular weight of the polymer (A) is no less than 100,000.

* * * * *